US007598959B2

(12) United States Patent
Kardach et al.

(10) Patent No.: US 7,598,959 B2
(45) Date of Patent: Oct. 6, 2009

(54) DISPLAY CONTROLLER

(75) Inventors: James P. Kardach, Saratoga, CA (US); David Williams, San Jose, CA (US); Achintya K. Bhowmik, Milpitas, CA (US); Barnes Cooper, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 438 days.

(21) Appl. No.: 11/169,509

(22) Filed: Jun. 29, 2005

(65) Prior Publication Data

US 2007/0002036 A1 Jan. 4, 2007

(51) Int. Cl.

| | |
|---|---|
| ***G09G 1/06*** | (2006.01) |
| ***G09G 5/00*** | (2006.01) |
| ***G09G 5/39*** | (2006.01) |
| ***G06F 3/038*** | (2006.01) |
| ***G06F 13/14*** | (2006.01) |
| ***G06F 13/372*** | (2006.01) |
| ***G06F 1/00*** | (2006.01) |
| ***G06T 17/00*** | (2006.01) |

(52) U.S. Cl. ......................... 345/534; 345/10; 345/213; 345/428; 345/520; 345/531; 713/501

(58) Field of Classification Search ................... 345/10, 345/213, 428, 520, 531, 534; 710/260, 305; 711/167; 713/260, 300–340, 500, 501, 502, 713/503, 600, 601; 395/750
See application file for complete search history.

(56) References Cited

U.S. PATENT DOCUMENTS

| | | | | |
|---|---|---|---|---|
| 5,446,840 | A | 8/1995 | Kiuchi et al. | |
| 5,524,249 | A * | 6/1996 | Suboh | 713/322 |
| 5,991,883 | A | 11/1999 | Atkinson | |
| 6,079,025 | A * | 6/2000 | Fung | 713/323 |
| 6,392,619 | B1 | 5/2002 | Nitta et al. | |
| 6,678,834 | B1 * | 1/2004 | Aihara et al. | 713/501 |
| 6,820,209 | B1 * | 11/2004 | Culbert et al. | 713/501 |
| 2003/0210247 | A1 * | 11/2003 | Cui et al. | 345/534 |

FOREIGN PATENT DOCUMENTS

| | | | |
|---|---|---|---|
| EP | 1239448 | A2 | 9/2002 |
| WO | WO-9641253 | A1 | 12/1996 |
| WO | WO-2007002921 | A2 | 1/2007 |

OTHER PUBLICATIONS

Bloks, R. H., "The IEEE-1394 High Speed Serial Bus", *Philips Journal of Research*, 50(1), (1996),209-216.

* cited by examiner

*Primary Examiner*—Xiao M Wu
*Assistant Examiner*—Aaron M Guertin
(74) *Attorney, Agent, or Firm*—Schwegman, Lundberg & Woessner, P.A.

(57) ABSTRACT

Apparatus and systems, as well as methods and articles, may operate to update video display pixels. A video display bus can communicate data to a video display according to specified clock frequencies and a refresh time period. Power conservation can be enhanced by adjusting the specified clock frequencies and/or refresh time period to provide idle time on the video display bus.

16 Claims, 4 Drawing Sheets

DISPLAY CONTROLLER

FIELD

Various embodiments described herein relate to computer devices, and more particularly to display controllers.

BACKGROUND

Mobile computing systems such as laptop computers, notebook computers, PDAs (Personal Digital Assistants) and the like are popular. A critical aspect of such systems is that they typically run using battery power when they are not or cannot be connected to an AC power source. As a result, mobile computers typically provide power management capabilities in order to run as long as possible off of battery power.

Various components on computing systems consume power. For example, a video display and memory associated with video display consume power. The display can be a Liquid Crystal Display (LCD) flat-panel display screens incorporating TFT (thin film transistor) technology to control pixels.

Most video displays need to be continually refreshed, typically by a graphics engine on a graphics (display) controller. The display may be refreshed pixel by pixel, with the graphics engine fetching the pixel data from memory. The act of fetching data can consume power on the graphics engine (or controller), the memory subsystem containing the pixel data, communication buses and the display device itself.

If the memory subsystem is a dynamic memory based system, the memory contents may need to be periodically refreshed. As such, the memory can perform a self-refresh operation when the memory is not actively being accessed. Further, it can be valuable to keep the memory in a self-refresh state when the computer system is idle. The display controller, however, can update the pixels of the display on a regular basis which can keep both the memory and the communication bus interface between the display controller and display screen in an active state.

A First-In First-Out (FIFO) buffer can be provided on the memory, or host side of the display controller. The display image data can be loaded into the FIFO from the memory, and the FIFO can then be used to refresh the display. The time between loading the FIFO with new image data can be used as idle time to place the memory into a self-refresh state. This idle time on the host memory bus may be related to the capacity size of the FIFO, the size/resolution of the display and the clock frequency (dotclock) used to refresh the display. For example, an 8 Kbyte to 16 Kbyte FIFO buffer can create from 20 to 60 us of idle time on the memory bus depending on attributes of the display.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the various embodiments of the invention, and it is to be understood that other embodiments may be utilized and that logical, mechanical, electrical and other changes may be made without departing from the scope of the present invention. The following detailed description is, therefore, not to be taken in a limiting sense.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

In the Figures, the same reference number is used throughout to refer to an identical component which appears in multiple Figures. Signals and connections may be referred to by the same reference number or label, and the actual meaning will be clear from its use in the context of the description.

Figure 1:
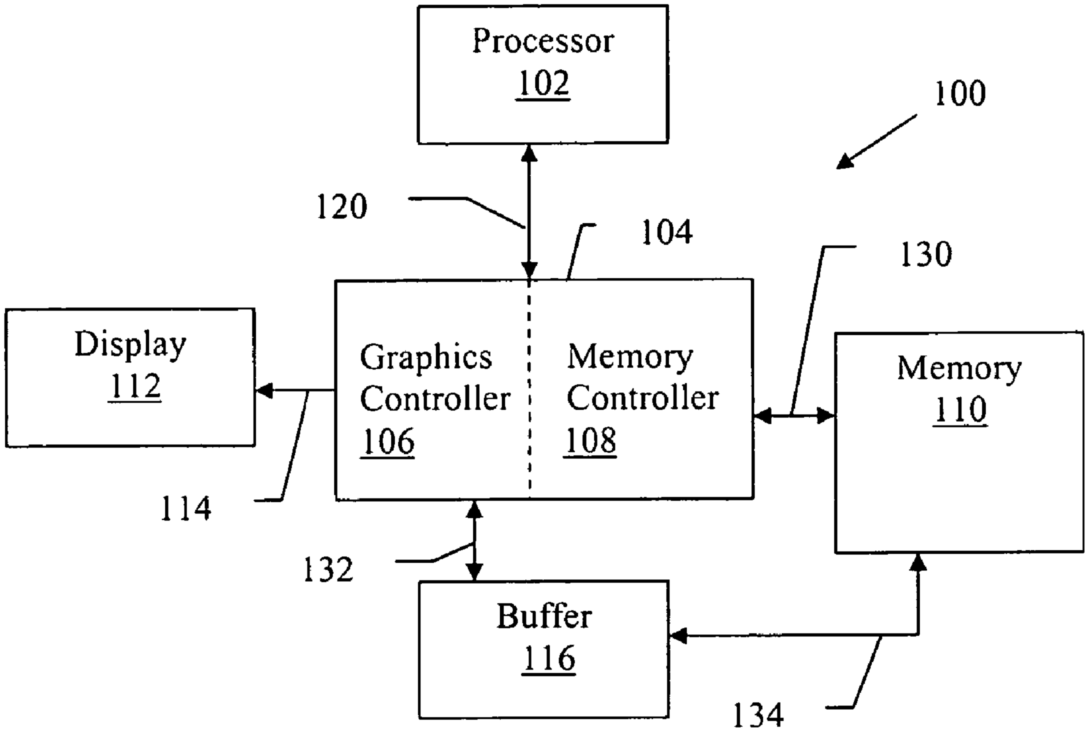
FIG. 1 is a block diagram of a system according to an embodiment of the invention.

FIG. 1 is a block diagram of the major components of a hardware environment 100 incorporating various embodiments of the invention. In general, the systems and methods of the various embodiments of the invention may be incorporated on a wide variety of hardware systems. Examples of such hardware includes laptop computers, portable handheld computers, personal digital assistants (PDAs), cellular telephones, and hybrids of the aforementioned devices. In some embodiments of the invention, hardware environment 100 comprises a processor 102, a graphics and memory controller 104, memory 110 and display 112. Communications between the processor and integrated graphics and memory controller 104 occurs via processor system bus 120 in some embodiments of the invention. The term bus as used herein includes any communication vehicle between two components, including but not limited to electrical, optical, single or multiple lines.

Processor 102 may be any type of computational circuit such as, but not limited to, a microprocessor, a complex instruction set computing (CISC) microprocessor, a reduced instruction set computing (RISC) microprocessor, a very long instruction word (VLIW) microprocessor, a graphics processor, a digital signal processor (DSP), or any other type of processor, processing circuit, execution unit, or computational machine. Although only one processor 102 is shown, multiple processors may be connected to system bus 120.

Graphics and memory controller 104 may provide graphics and video functions and interface one or more memory devices 110. In some embodiments, graphics and memory controller 104 may be integrated on a single chip and may include graphics controller 106 and memory controller 108.

In alternative embodiments, graphics controller 106 may reside on a separate chip or chipset from memory controller 108. In further alternative embodiments, graphics controller 106 may reside on a video controller card (not shown). Graphics controller 106 may include various graphics sub-portions such as a 3-dimensional (3D) engine, 2-dimensional (2D) engine, video engine, etc.

Graphics controller 106 can provide data to display 112 via bus 114. Display 112 can be any pixel based display, for example the display may be an LCD (Liquid Crystal Display) that is integral to many mobile computing environments, or an external display. In some embodiments, the bus interface 114 may be a LVDS (Low Voltage Differential Signal) interface. Additionally, bus 114 may be a Digital Video Out Port (DVOB or DVOC) or a CRT interface such as a VGA interface.

Memory controller 108 can interface with system memory 110. In some embodiments, memory 110 comprises DDR-SDRAM (Double Data Rate-Synchronous DRAM), a type of SDRAM that supports data transfers on both edges of each clock cycle (the rising and falling edges), effectively doubling the memory chip's data throughput. DDR-SDRAM typically consumes less power, which makes it well-suited to mobile computing environments. Other dynamic memory devices requiring periodic refresh operations can be used in embodiments of the present invention.

In some embodiments, a frame buffer 116 is provided to store data transferred from the memory 110 and destined for display 112. Frame buffer 116 may be a FIFO buffer or other memory that stores pixel values for pixels of display 112. Although buffer 116 is illustrated as coupled to controller 104 via bus 132 and coupled to memory 110 via bus 134, the buffer can be located anywhere between a core of memory 110 and the display. As such, in some embodiments the buffer can be incorporated in the memory or the controller. The amount of storage required for buffer 116 typically depends on the pixel depth (e.g. the number of bits used for each color), the display screen width and the display screen height.

Embodiments of the invention increase idle time of the memory bus 130 and idle time of the controller 104 between display frame updates. In embodiments where display 112 includes liquid crystal and thin film transistors a display write remains stable for a time period, for example in one embodiment pixels are stable for about 22 ms. In general, a display pixel can maintain its color for roughly 20 ms. Other displays may have similar data retention periods.

Each pixel of display panel 112 can be written once and then allowed to decay based on a refresh rate, for example a refresh operation can be initiated once every 1/60 of a second or every 16.67 ms. Traditionally the display panel is updated at a constant rate based upon the refresh rate and in combination with the display characteristics including pixel depth, horizontal and vertical resolutions and vertical and horizontal blanking rates. In prior systems, the clocking rate (dot clock) of a bus such as bus 114 is generated to allow the display pixels to be updated at an even rate. For example, a display panel with an SXGA+ resolution (horizontal×vertical=1400×1050) with a pixel depth of 32 bpp (bits per pixel) with a refresh rate of 60 Hz requires a dot clock frequency of about 121 MHz.

Figure 2:
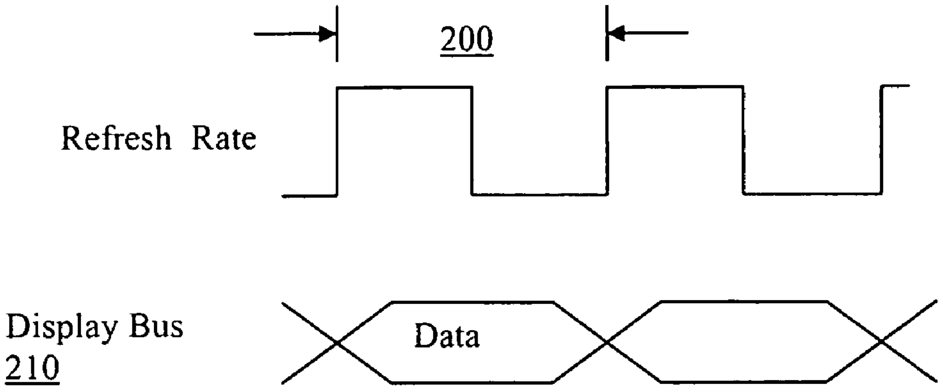
FIGURE 2 Prior Art
FIG. 2 illustrates display refresh timing of a prior art.

In prior systems the display interface bus 114 remains active at all times. FIG. 2 illustrates a prior art refresh display timing. The refresh time period 200 is predetermined for a selected display. For example, if the refresh rate is 60 Hz, every 1/60 second the display is updated. The full 1/60 second refresh time period is used to communicate the display pixel data to the display. Display bus 210 is active during the full refresh period. Updating the display panel at a constant rate does not allow the display bus to be powered down. Further, memory and clocking circuits are maintained in active states. As explained above, a frame buffer time can create idle time on the host side of the controller to allow the system memory to enter a self-refresh for a large percentage of the time between buffer loads.

Figure 3:
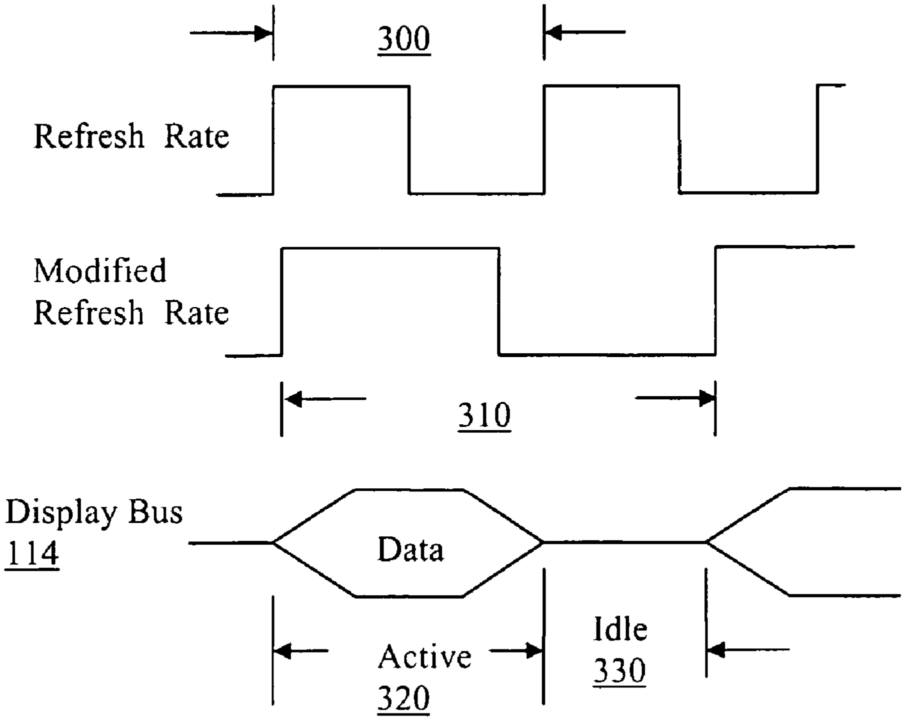
FIG. 3 illustrates display refresh timing according to an embodiment of the invention.

Embodiments of the invention can modify the display refresh rate during idle periods in system 100, or display inactivity (where pixel data of the display does not change) to increase an idle time of the controller 104 and/or display bus 114. That is, increasing the time between display refresh operations can increase the idle time of the controller(s). Referring to FIG. 3, the display refresh rate can be decreased from a first refresh rate 300 to a second, longer refresh rate 310. The dot clock frequency of data on bus 114, however, can remain at the same frequency. As such, the display bus can be active during time period 320 and idle for period 330. The refresh rate, in one embodiment, can be modified in response to a display idle period (display not being updated).

Figure 4:
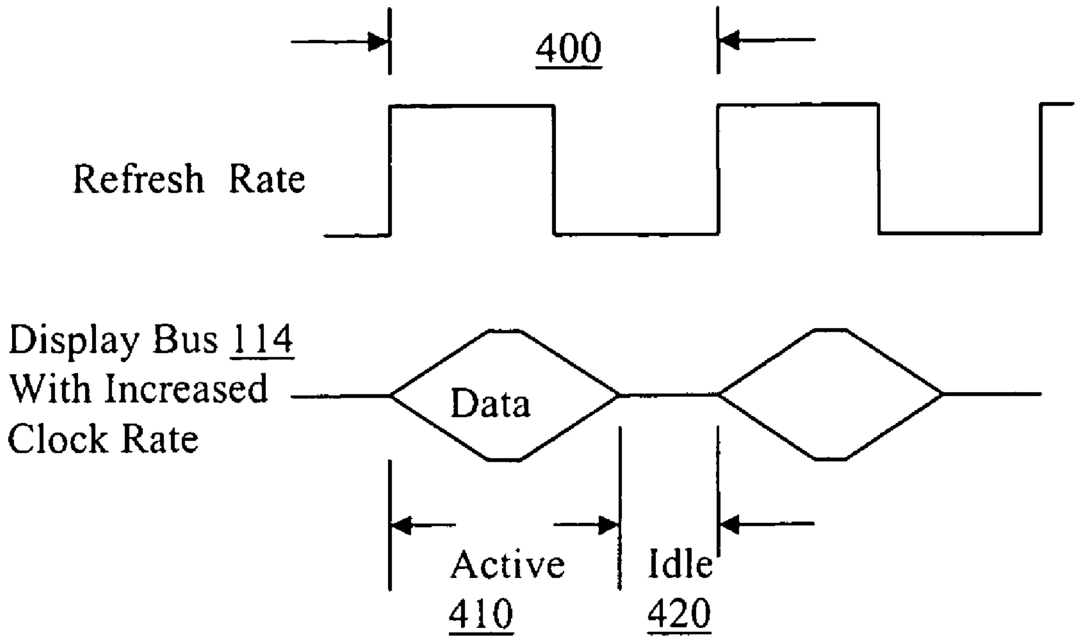
FIG. 4 illustrates display refresh timing according to another embodiment of the invention.

Embodiments of the invention can modify the dot clock relative to an allotted display refresh time period to create idle periods on a display bus. This modification can be related to, but is not limited to, system video display idle times. In one embodiment, the clock (dot clock) frequency used to communicate pixel data to the display can be increased during the system idle time to decrease the time needed to perform a refresh of the display. Referring to FIG. 4, it is illustrated that the display refresh time 400 can remain constant in this embodiment. The dot clock frequency can increase such that a busy communication bus is modified to have a data communication time 410 and an idle time 420.

For an example display that is refreshed with a 60 Hz refresh rate, increasing the dot clock can increase bus 114 idle times. That is, for a specific configuration, increasing the dot clock by 10% can provide 1.5 ms of idle time generated at the end of a frame interval. Increasing the dot clock by 20% can provide 2.7 ms of idle time, and increasing the dot clock by 30% can provide 3.8 ms of idle time on the display bus.

Therefore, by providing a slightly higher dot clock to a display panel, the idle time generated after the entire display frame has been updated can be used for power management techniques such as powering down the panel interface bus 114, powering down logic of controller 104 and powering down clocking systems such as phase lock loop (PLL) circuits (not shown).

It is noted that while not all embodiments incorporate all of the above features, the features can be combined in some embodiments. For example, combining the features during system 100 idle, or video display inactive, periods can allow more self refresh time for memory 110 and additionally allow the powering down of external clocking and the panel interface bus 114 on the client side of the controller. Additional embodiments of the invention can align the idle time of the display bus 114 with the interruption frequency of an operating system (OS tick rate) executed by the processor 102.

Table 1 helps illustrate some benefits of an embodiment of the invention.

TABLE 1

| Display Characteristics | Display Refresh | Dot Clock Frequency | Memory Self Refresh (SR) Duty Cycle | Memory SR with Increased Dot Clock | Memory SR with Increased Dot Clock and Display Idle Time |
|---|---|---|---|---|---|
| 1024 × 768 @ 32 bpp | 60 Hz | 65 | 90.61% | 88.8% | 90.67% |
| 1400 × 1050 @ 32 bpp | 60 Hz | 121 | 82.87% | 79.6% | 83.05% |
| 1600 × 1200 @ 32 bpp | 60 Hz | 160.96 | 77.55% | 73.4% | 77.86% |
| 1600 × 1200 @ 32 bpp | 75 Hz | 205.99 | 71.76% | 66.6% | 72.25% |
| 2048 × 1538 @ 32 bpp | 60 Hz | 266.95 | 64.25% | 58.0% | 65.05% |
| 2048 × 1538 @ 32 bpp | 75 Hz | 340.47 | 55.72% | 48.3% | 57.00% |
| 2048 × 1538 @ 32 bpp | 85 Hz | 388.41 | 50.45% | 42.4% | 52.11% |

Column one of Table 1 provides the display characteristics for seven different example displays. The characteristics include Horizontal×Vertical relative resolution at a bit per pixel (bpp) depth. Column two is the display refresh rate, and column three is a Dot Clock frequency needed to refresh the display at the specified refresh (no idle time). Column four provides the memory bus self refresh duty cycle between FIFO fill operations (prior art), without display bus idle time provided by embodiments of the present invention. Column four, therefore, provides a prior art self refresh base-line for comparison purposes. In the above examples a 16 K byte FIFO buffer can provide an average memory auto refresh period of about 77.55% for the 1600×1200 @ 32 bpp display.

In this embodiment, the dot clock frequency is increased by 20% while the display refresh time remains constant. By increasing the dot clock frequency, the FIFO may be filled by the memory more often. As such, the memory bus idle time and memory refresh can be decreased. As shown in column five, an average memory auto refresh duty cycle decreases from 77.55% to 73.4% for the 1600×1200 @ 32 bpp display as a result of the increased memory bus activity.

By increasing the dot clock, idle time can be provided on the display bus 114. When the display bus is idle, the FIFO does not need to be filled. As such, the display bus idle time can contribute to the memory self refresh time. Column six shows that the memory self refresh duty cycle can be increased by the extended idle time at the end of the display frame update. For the 1600×1200 @ 32 bpp display, the average memory auto refresh duty cycle increases from the prior art value of 77.55% to 77.86% when the display idle time is considered.

The above illustrated examples are provided for explanatory purposes only. The buffer size, memory bus communication speed and other variables may alter table values. As such, Table 1 is provided to illustrate that increasing the display dot clock frequency while maintaining a display refresh rate can provide added idle time that can be used for memory self refresh. It will be appreciated that further increases in the dot clock frequency (above the illustrated 20%) can provide additional self refresh duty cycle.

As explained, the memory self refresh (SR) duty cycle percentage can be slightly increased while also creating more opportunities to save power with very little logic cost. That is, additional power savings beyond the memory self refresh can be achieved by turning off external system phase lock loops (PLL's) and powering down the physical interface(s) between the display controller 104 and the FIFO 116.

Figure 5:
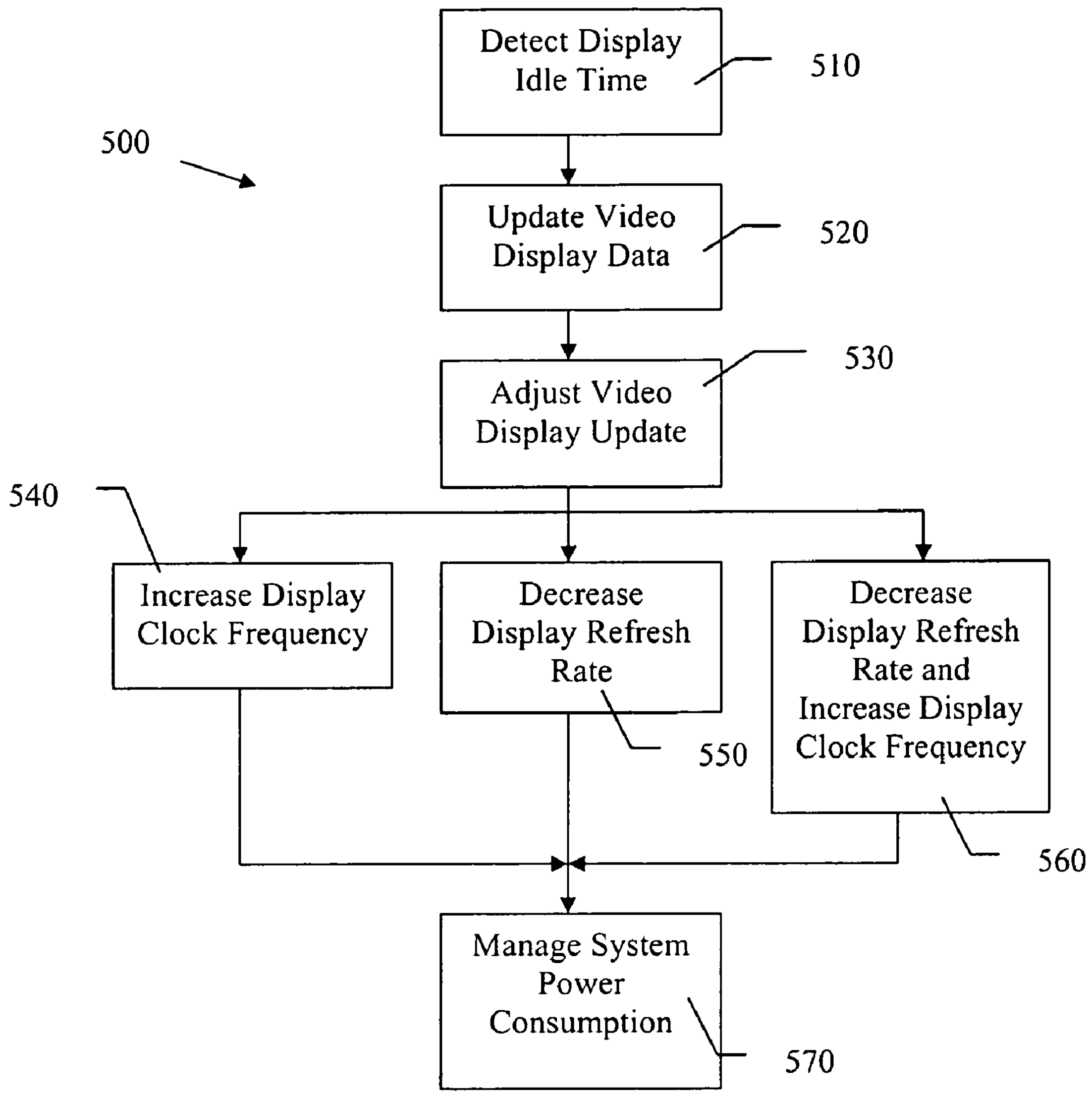
FIG. 5 is a flow chart illustrating methods according to embodiments of the invention.

FIG. 5 is a flowchart illustrating methods 500 for modifying display refresh operations according to embodiments of the invention. The methods may be performed within a hardware or software operating environment.

As described above, the system can optionally detect display idle time 510 when the display data remains constant. In response to the detection, or in the absence of the optional detection step, the video display can be updated 520. The display update can be adjusted 530 to manage the communication bus to the display. To provide idle time on the display bus, the display clock frequency can be increased 540, the display refresh rate can be decreased 550, or both the display clock frequency can be increased and the display refresh rate can be decreased 560. The power consumption of the system can be managed 570 for example by placing the memory in self-refresh, and idling clock circuits and processors.

Embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

We claim:

1. An apparatus comprising:

a controller to update pixel data of a display during a display refresh time, wherein the controller is to communicate a content of a buffer to the display at a clock frequency via a display bus, wherein the buffer is to be loaded from a memory via a memory bus, and wherein the controller is to increase the clock frequency to provide increased idle time on the memory bus and on the display bus, the increased idle time on the memory bus to enable a self-refresh time of the memory to be increased, and the increased idle time on the display bus to enable one or more of the display bus and logic of the controller to be powered-down.

2. The apparatus of claim 1 further comprising a processor coupled to communicate instructions to the controller, wherein the controller increases the clock frequency to provide increased idle time on the display bus in response to the instructions.

3. The apparatus of claim 2 wherein the idle time on the display bus is aligned in time with an idle time of the processor.

4. The apparatus of claim 1 wherein the clock frequency is increased in response to detected display inactivity.

5. The apparatus of claim 1 wherein the refresh time is adjusted.

6. The apparatus of claim 1 further comprising a memory controller coupled to the memory, and wherein the buffer resides in the memory.

7. The apparatus of claim 6 wherein the controller and the memory controller are integrated into a single chipset.

8. A system comprising:

a processor;

a memory;

a frame buffer coupled to the memory;

a liquid crystal video display; and a graphics controller coupled to the processor and the frame buffer, the graphics controller to update the video display from the frame buffer according to a display refresh rate, wherein the graphics controller is coupled to communicate a content of the frame buffer to the video display at a clock frequency via a display bus, wherein the frame buffer is to be loaded from the memory via a memory bus;

wherein the processor is to provide instructions to the graphics controller to increase the clock frequency to provide increased idle time on the memory bus and on the display bus, the increased idle time on the memory bus to enable a self-refresh time of the memory to be increased, and the increased idle time on the display bus to enable one or more of the display bus and logic of the controller to be powered-down.

9. The system of claim 8 wherein the processor is to provide the instructions to the graphics controller in response to detected display inactivity.

10. The system of claim 8 wherein a refresh time is adjusted.

11. A method comprising:

transferring data from a memory to a buffer via a memory bus;

updating a video display from the buffer according to a display refresh rate via a display bus; and increasing a clock frequency of data communicated on the memory bus and on the display bus to provide increased idle time on the memory bus and on the display bus, the increased idle time on the memory bus to enable a self-refresh time of the memory to be increased, and the increased idle time on the display bus to enable one or more of the display bus and logic of the controller to be powered-down.

12. The method of claim 11 further comprising decreasing the display refresh rate.

13. The method of claim 11 further comprising aligning the idle time on the display bus with an idle time of a system processor.

14. The method of claim 11 further comprising detecting video display inactivity, and wherein increasing a clock frequency of data communicated on the display bus is performed in response to the detected display inactivity.

15. A machine-accessible medium having associated information, wherein the information, when accessed, results in a machine performing:

transferring data from a memory to a buffer via a memory bus;

updating a video display from the buffer according to a display refresh rate via a display bus;

detecting video display inactivity; and in response to the detected video display inactivity selectively adjusting the updating of the video display to provide increased idle time on the memory bus and on the display bus, wherein selectively adjusting the updating of the video display comprises adjusting the refresh rate and increasing a clock frequency of data communicated on the memory bus and on the display bus, the increased idle time on the memory bus to enable a self-refresh time of the memory to be increased, and the increased idle time on the display bus to enable the display bus to be powered-down.

16. The machine-accessible medium of claim 15 wherein selectively adjusting the updating of the video display comprises decreasing the refresh rate while increasing the clock frequency of data communicated on the display bus.

* * * * *

UNITED STATES PATENT AND TRADEMARK OFFICE
CERTIFICATE OF CORRECTION

PATENT NO. : 7,598,959 B2
APPLICATION NO. : 11/169509
DATED : October 6, 2009
INVENTOR(S) : Kardach et al.

It is certified that error appears in the above-identified patent and that said Letters Patent is hereby corrected as shown below:

On the face page, in field (54), in column 1, line 1, delete "DISPLAY CONTROLLER" and insert -- DISPLAY REFRESH APPARATUS AND METHODS --, therefor.

In column 1, line 1, delete "DISPLAY CONTROLLER" and insert -- DISPLAY REFRESH APPARATUS AND METHODS --, therefor.

Signed and Sealed this

Twenty-sixth Day of January, 2010

David J. Kappos

David J. Kappos
*Director of the United States Patent and Trademark Office*

UNITED STATES PATENT AND TRADEMARK OFFICE

CERTIFICATE OF CORRECTION

PATENT NO. : 7,598,959 B2
APPLICATION NO. : 11/169509
DATED : October 6, 2009
INVENTOR(S) : Kardach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 688 days.

Signed and Sealed this

Twenty-eighth Day of September, 2010

David J. Kappos

*Director of the United States Patent and Trademark Office*